United States Patent [19]

Hulin

[11] 4,433,573

[45] Feb. 28, 1984

[54] METHOD AND APPARATUS FOR DETERMINING THE FLOW CHARACTERISTICS OF A FLUID IN A WELL

[75] Inventor: Jean-Pierre Hulin, Saint-Maur, France

[73] Assignee: Schlumberger Technical Corporation, Houston, Tex.

[21] Appl. No.: 391,276

[22] Filed: Jun. 23, 1982

[51] Int. Cl.$^3$ ............................................. E21B 47/00
[52] U.S. Cl. ..................................................... 73/155
[58] Field of Search ........... 73/861.22, 861.23, 861.24, 73/155

[56] References Cited

U.S. PATENT DOCUMENTS

3,954,006  5/1976  Anderson et al. ..................... 73/155
4,169,376  10/1979  Herzl ................................. 73/861.24

Primary Examiner—Jerry W. Myracle

[57] ABSTRACT

The method according to the present invention for determining the flowrate of a fluid flowing in a well comprises the steps of lowering in the well a logging sonde comprising at least one vortex street generating obstacle and a transducer responsive to pressure variations due to the generation of vortices, the transducer producing, for each depth in the well, a detection signal the useful component of which has a frequency f and an amplitude A, deriving from the detection signal a first signal indicative of frequency f, deriving from the detection signal a second signal indicative of the reduced amplitude Ar, defined as the ratio $A/f^2$, and forming from the first and second signals an indication of the flowrate in accordance with a first predetermined relationship expressing the frequency f as a function of the flowrate and of the bubble rate of the fluid at the respective depth, the first relationship including a linear dependency of the frequency f upon the flowrate, and a second predetermined relationship expressing the reduced amplitude Ar as a function of the bubble rate and of the flowrate.

9 Claims, 8 Drawing Figures

METHOD AND APPARATUS FOR DETERMINING THE FLOW CHARACTERISTICS OF A FLUID IN A WELL

BACKGROUND OF THE INVENTION

The present invention relates to a method and an apparatus for determining the flow characteristics of fluid flowing in a well, particularly the fluid produced in an oil well.

It has long been known that if an obstacle of suitable shape is placed across a single-phase flow, vortices are emitted alternately on each side of the obstacle with a frequency f proportional to the flow velocity. This is the phenomenon referred to as Karman vortex streets. By detecting the passage of the vortices, it is thus possible to determine the fluid flowrate.

The characteristics of flowmeters operating according to this principle are enumerated in the article by R. S. Medlock: "The Vortex Flowmeter—Its Development and Characteristics" which appeared in the Australian Journal of Instrumentation and Control, April 1976, pages 31-32. Among the advantages may be mentioned, notably, the extensive measurement range (100:1), the total absence of moving parts, and the calibration simplicity.

These advantages are particularly valuable for flowrate measurement in a hydrocarbon well using a sonde suspended from a transmission cable. A vortex emission sonde adapted to these very specific measurement conditions forms the subject of copending U.S. patent application Ser. No. 327,973, filed on Dec. 7, 1981. The sonde described therein uses a differential pressure transducer to detect the passage of the vortices.

The sonde described in that application comprises, as a transducer sensitive to the passage of the vortices, a differential pressure transducer.

However, the fact that the fluid produced by an oil well is frequently a gas-liquid mixture raises a problem. It has been noted that in the case of a gas-liquid mixture, the proportionality relationship between the liquid flow rate Q and the frequency f is modified in that the ratio f/Q increases slightly with the proportion of bubbles Y. At least an approximate knowledge of the bubble rate is hence necessary for determining the flow rate with satisfactory accuracy.

It should be noted that the bubble rate constitutes valuable information in itself. The measurement of this proportion at different depths makes it possible to detect the bubble point, i.e. the level at which the reduction in hydrostatic pressure allows the gas, until then dissolved in the liquid, to begin to form a distinct phase.

As disclosed, e.g. in U.S. Pat. No. 4,169,376, the amplitude of a signal produced by a pressure transducer associated with a vortex shedding obstacle is, in the case of a monophasic fluid, proportional to the fluid density and to the square of the flow rate. By processing the signal to substantially suppress the dependency of the amplitude on the flow rate, a reduced amplitude $A_r$ proportional to the fluid density will be obtained. But in itself, such a dependency on the density rather implies a low sensitivity of the amplitude to the presence of bubbles. In the presence of bubbles the mean density of the fluid shows a decrease, but the relative decrease is of the same order as the bubble rate, and in fact is slightly lower since the gas density is not fully negligible in the conditions of a well.

SUMMARY OF THE INVENTION

The present invention is based on the discovery that a given increase in the bubble rate results in a much greater decrease in the reduced amplitude $A_r$. This very pronounced amplification—the "gain" capable of reaching a value of about 7 to 8—stems from the fact that the gas bubbles are "trapped" by the vortices. In other words, the proportion of bubbles in the vortices is clearly higher than the mean proportion of bubbles in the fluid. The result is that the local density in the wake of the obstacle is clearly lower than the mean density, thus explaining the pronounced dependence of the reduced amplitude with respect to the proportion of bubbles.

It has also been noted that the variations in the reduced amplitude depend somewhat on the flowrate as of a certain value of Y, the decrease being faster at high flowrates. This can be explained by the effect of bubble saturation of the vortices. The vortices become saturated with bubbles from a given value of the bubble rate, which value becomes higher as the flow rate is the higher.

To summarize, the method in accordance with the invention takes advantage of this high sensitivity of the amplitude to the bubble rate and provides the derivation of the flow rate from the frequency f and the reduced amplitude based on a first relationship defining the above-mentioned influence of the bubble rate on the linear frequency/flow rate relationship and a second relationship expressing the dependency of the reduced amplitude primarily on the bubble rate and secondarily on the flow rate.

BRIEF DESCRIPTION OF THE DRAWINGS

The invention will be better understood through the following description given with reference to the appended drawings.

In the drawings.

DESCRIPTION OF THE PREFERRED EMBODIMENT

Figures 1, 2, 3:
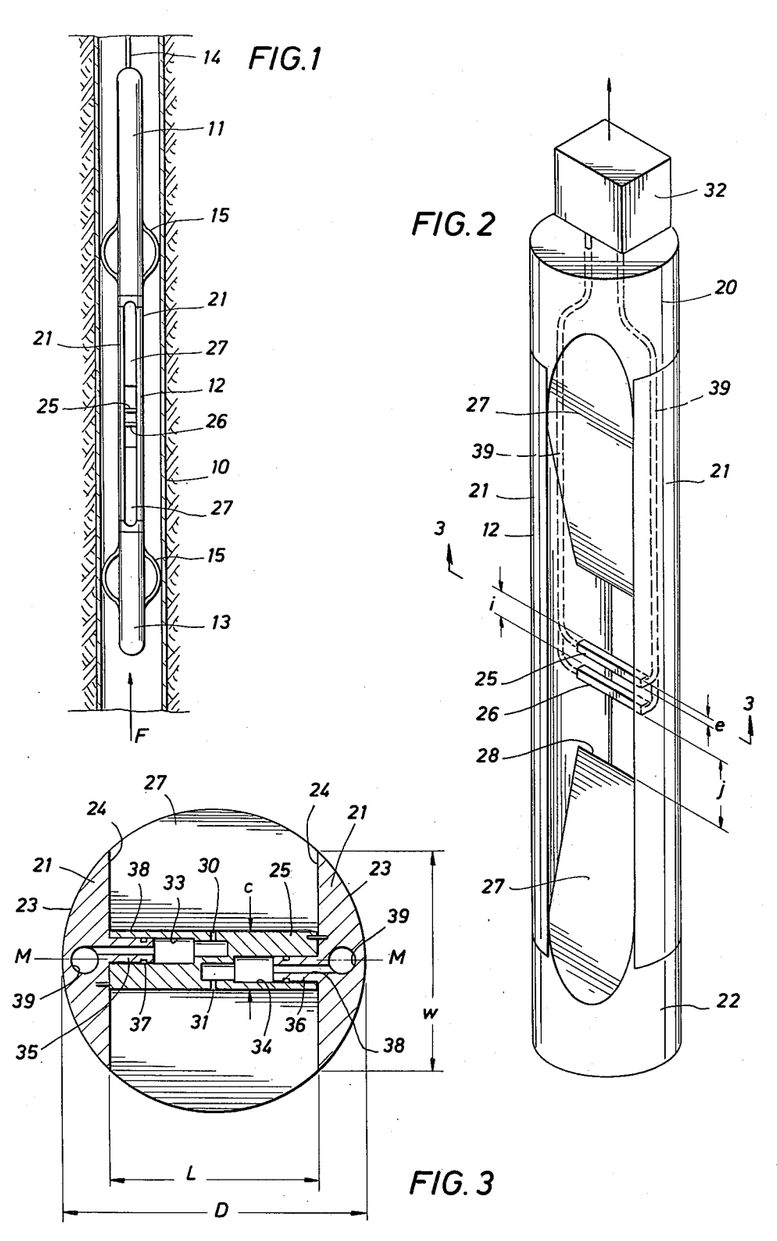
FIG. 1 represents a logging sonde for flowrate measurement in a hydrocarbon well.
FIG. 2 shows in perspective, in a larger scale, the central part of the sonde of FIG. 1.
FIG. 3 is a cross-section along the plane III—III of FIG. 2.

FIG. 1 represents a sonde adapted to flowrate measurement in a well 10. The well 10 is an oil producing well in which the fluid flows upward as represented by the arrow F.

The sonde, of generally circular section, comprises an upper part 11, a central part 12, and a lower part 13 fixed rigidly end to end. The central part 12, which will be described in detail below, serves to create vortex streets and to detect the passage of these vortices. The upper part 11 is suspended from a cable 14 which connects the sonde mechanically and electrically to surface equipment, not shown in FIG. 1. This surface equipment includes, in a conventional manner, a winch for reeling and unreeling the cable 14, and signal processing and recording means whose features will be described below.

The upper part 11 contains a transducer which produces a detection signal, and circuits which process this signal for its transmission via the cable 14.

The lower part 13 acts, by its own weight, to facilitate the lowering of the sonde in the well against the pressure of the fluid.

Centering elements 15 are fixed respectively on the upper part 11 and on the lower part 13, symmetrically in relation to the central part 12. These centering elements are found conventionally in logging apparatus and need not be described here in detail. They allow the centering of the sonde in relation to the cylindrical wall of the well-casing or production string—so that the flow velocity measured is indeed the velocity in the central flow zone.

The central part 12 is represented in a larger scale in FIG. 2, and FIG. 3 shows a cross-section thereof. Referring thereto, the central part includes an upper end piece 20 to which are fixed two parallel side members 21 directed along the flow path, at the opposite ends of which is fixed a lower end piece 22. The upper and lower parts 11 and 13 are fixed respectively to the end parts 20 and 22. The attachment between the side members 21 and the end pieces is achieved by any suitable means, for example by screws not shown.

The end pieces 20 and 22 have a circular section of diameter D and the outer walls 23 of the side members 21 constitute circular sectors of the same diameter D lined up exactly with the end pieces.

On the other hand, the side members have inner walls 24 which are flat and parallel, separated by a distance L equal to about 0.7 D, D being defined as above. The width w of the inner walls 24, i.e. their dimension transverse to the flow, is of the same order as the distance L.

Between the side members 21 are fixed two vortex-generating elongated members 25,26 hereinafter called obstacles. The obstacles 25,26 have identical rectangular sections. They are placed perpendicular to the inner walls 24 and symmetrically in relation to the median plane M of the walls 24 which is parallel to the flow.

The appropriate proportions for the obstacles 25,26 are the following: the ratio between the front width c (width of the rectangular face transverse to the flow) and the length of each obstacle, equal to the distance L between the walls 24, is between 0.20 and 0.40, and the ratio between the front width c and the thickness e (width of the faces parallel to the flow) is about 3/2.

The arrangement with two obstacles provides greater assurance of continuous vortex emission than with a single obstacle. In a suitable manner, the interval i between the upper edges of the obstacles 25 and 26 is of the order of 5c, c being the front width mentioned above.

Each of the end pieces 20,22 is extended in the direction of the obstacles 25,26 by a wedge-shaped profile 27 which extends between the side members 21. The profiles 27 constitute a symmetrical assembly in relation to the obstacles 25,26.

Each profile 27 has a triangular section and tapers from the respective end piece (which has a circular section) up to an edge 28 parallel to the obstacles 25,26 and located in the median plane M of the walls 24 of the side members. The edges 28 are spaced from the adjacent obstacle at a distance j substantially equal to twice the interval i between obstacles.

The profiles 27 serve to minimize spurious turbulences due to the separation of the boundary layer on the end piece located upstream of the obstacles, the lower piece 22 in the present case. The angle of about 5° between each face of a profile 27 and the corresponding end pieces allows a suitable reduction of the turbulences while avoiding excessive elongation of the central part 12. This amounts to an apex angle of about 10° for the profiles 27.

The detection of the passage of vortices emitted alternately on each side of the obstacle 25 is achieved by two pressure tapping orifices 30,31 leading onto the opposite faces, parallel to the flow, of the obstacle 25. These two orifices are connected to a differential pressure transducer 32 represented schematically in FIG. 2 and contained, as indicated above, in the upper part 11. The transducer 32 can be a variable reluctance magnetic transducer such as model DP9 of the Validyne company (Northridge, Calif.).

In the example shown, the connection between the orifices 30,31 and the transducer 32 is provided in the following manner. Obstacle 25 includes two bores 33,34 directed along its length and formed from its opposite ends. The bores 33,34 are extended by sections of smaller diameter which communicate respectively with the orifices 30,31. The bores 33,34 also make it possible to fit the obstacle on two dowels 35,36 formed or fixed respectively on the side members 21, each dowel receiving a seal 37 in a groove. The dowels are pierced with central holes 38 which place in communication the bores 33,34 respectively with conduits 39 formed in the side members 21 and in the upper end piece 20, and connected to the sensing element 32. The upstream obstacle 26 is assembled in the same manner as the obstacle 25 on dowels connected to the side members 21.

Adaptation to measurement in an injection well implies that the obstacles 25 and 26 can exchange their functions. For this purpose, the conduits 39 are extended up to the obstacle 26, as shown in FIG. 2, and obstacles of identical form are used, the orifices of the upstream obstacle being closed off by means of removable plugs so that only those of the downstream obstacle serve as pressure taps.

As concerns the transducer 32, it should be noted that it is placed inside a chamber filled with inert fluid placed in pressure equilibrium with the fluid of the well by a compensation piston. This is a conventional arrangement in logging sondes for hydrocarbon wells and need not be described in greater detail here. It prevents the transducer from having to support the high pressure of the well fluid, without changing the result of the measurement. This measurement in fact entails the difference between the pressures taken on the opposite faces of the obstacle.

Figure 4:
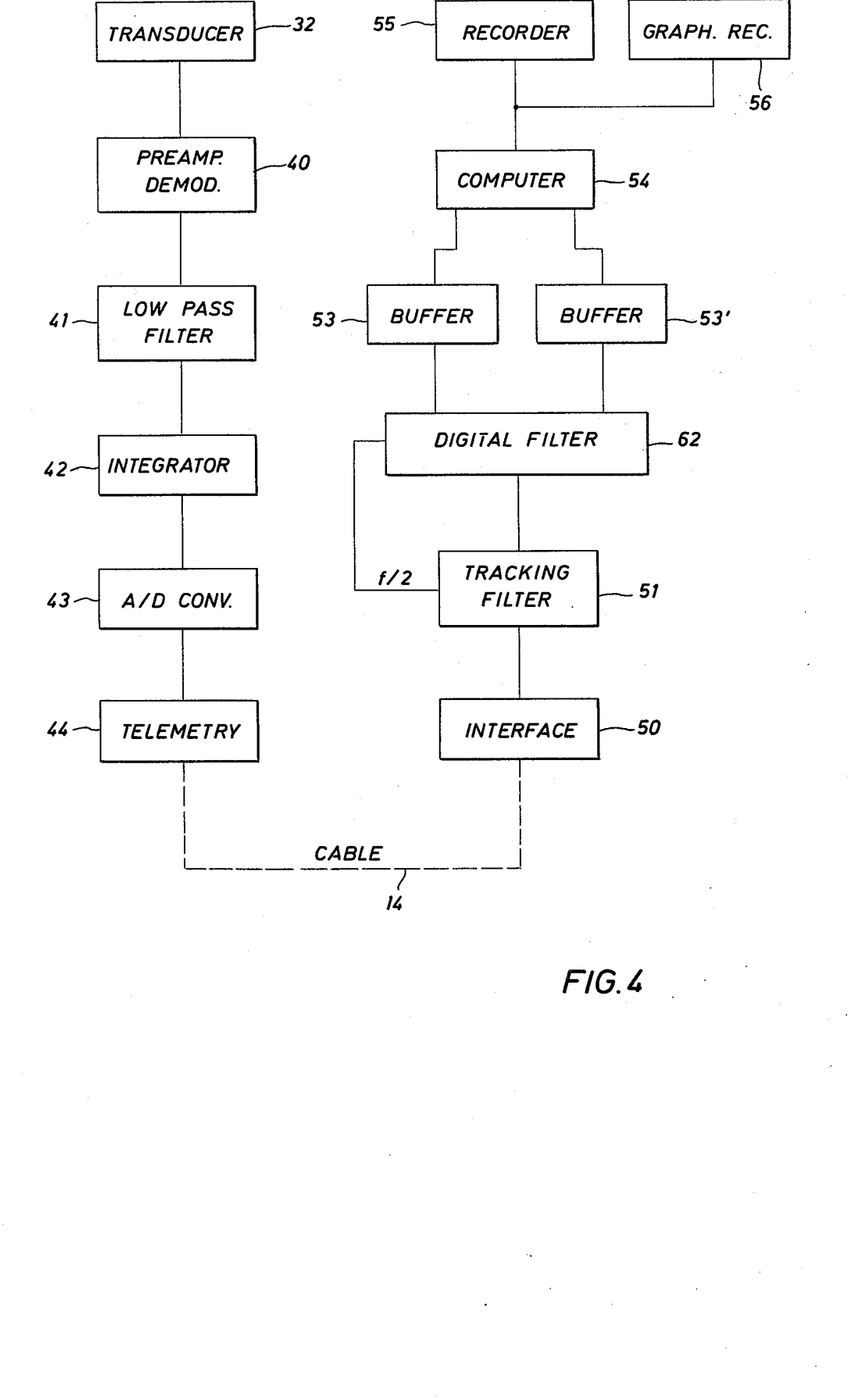
FIG. 4 shows, in the form of a block diagram, the signal processing equiment.

FIG. 4 represents, in the form of a block diagram, the electronics contained in the upper part 11 and the signal processing means in the surface equipment. Transducer 32 receives an excitation signal of constant frequency which is amplitude-modulated by the variations in the measured parameter, namely the difference between the pressures on the opposite faces, parallel to the flow, of the downstream obstacle. A preamplification and demodulation unit 40 is associated with the transducer 32 and delivers a composite signal whose useful component has a frequency f equals to the frequency of vortex emission from a given face of the obstacle.

In the case of a monophasic fluid, this frequency is proportional to the apparent flow velocity V "seen" by the sonde, which velocity equals the actual flow velocity minus the velocity at which the sonde is displaced. The ratio f/V is therefore a constant. In the case of a diphasic liquid-gas mixture, it exhibits a slight increase with the gas holdup as described below.

Furthermore, since transducer 32 is a pressure transducer, the amplitude A of the useful component of the detection signal depends on the local pressure and is proportional to the density d of the fluid and to the square of the velocity V.

The fact that the amplitude of the detection signal from the unit 40 is proportional to the square of the velocity V results in a very wide dynamic range, incompatible with transmission by the cable 14. In order to reduce this dynamic range, the signal from unit 40 is, after filtering by a low-pass filter 41, applied to an integrator 42. The integration results in dividing the amplitude A of the signal by the frequency f, i.e. by the velocity V. The amplitude Ac of the signal once integrate is proportional to the velocity V, which gives a more acceptable dynamic range.

The signal derived from the integrator 42 is applied to an analog-to-digital converter 43, and the digital signal Sc thus derived is conveyed to the surface equipment by the cable 14 via a telemetry unit 44 commonly used in well logging.

The surface equipment includes an interface unit 50 connected to the cable 14. Unit 50 restores the digital signal which was applied to the telemetry unit 44 of the sonde. The signal Sc is fed to a tracking filter 51 and the filtered signal is applied to a device 52 which derives the frequency f and the amplitude Ac of the useful component of the signal. The device 52 is advantageously embodied as a computer programmed to achieve so-called adaptive lattice filtering. Such a filtering technique is described in detail in M. Morf et al "Recursive Least Squares Ladder Forms for Fast Parameter Tracking" IEEE Conf. Decision and Control, Jan. 1979.

The tracking filter 51 is a high-pass filter of the notch filter type, having a cutoff frequency which is one-half of the frequency f. The frequency data f/2 is supplied by the device 52.

The device 52 yields, in the form of digital data, the frequency f and the amplitude Ac of the useful component of signal Sc, which are entered into buffer memories 53 and 53'. These memories are read by a computer 54, which derives the bubble rate Y and the flow rate Q for each depth H of the section traversed by the sonde and in which it is desired to determine the flow characteristics. The depth matching of the data is carried out in a conventional manner from pulses generated by the cable as it is reeled on the winch. The data Q and Y thus furnished are stored in a recording device 55, for example a magnetic tape recorder, and applied to a graphic recorder 56 which produces logs of the flowrate and, if desired, the bubble rate.

The calculation principle used in the computer 54 is as follows. In the case of a liquid or a gas, the ratio f/Q is substantially constant over a wide flowrate range. In the presence of a gas-liquid mixture, a vortex emission flowmeter is utilizable if the proportion of gas is smaller than about 30%. Between 0% and about 10%, the frequency spectrum of the signal produced by the transducer exhibits a very clear spectrum line at the frequency f. Between about 10% and about 30%, the spectrum widens, but spectral analysis makes it possible to define a characteristic frequency. Beyond 30%, vortex emission becomes erratic and it is practically no longer possible to determine a frequency representative of the flowrate.

Figure 6:
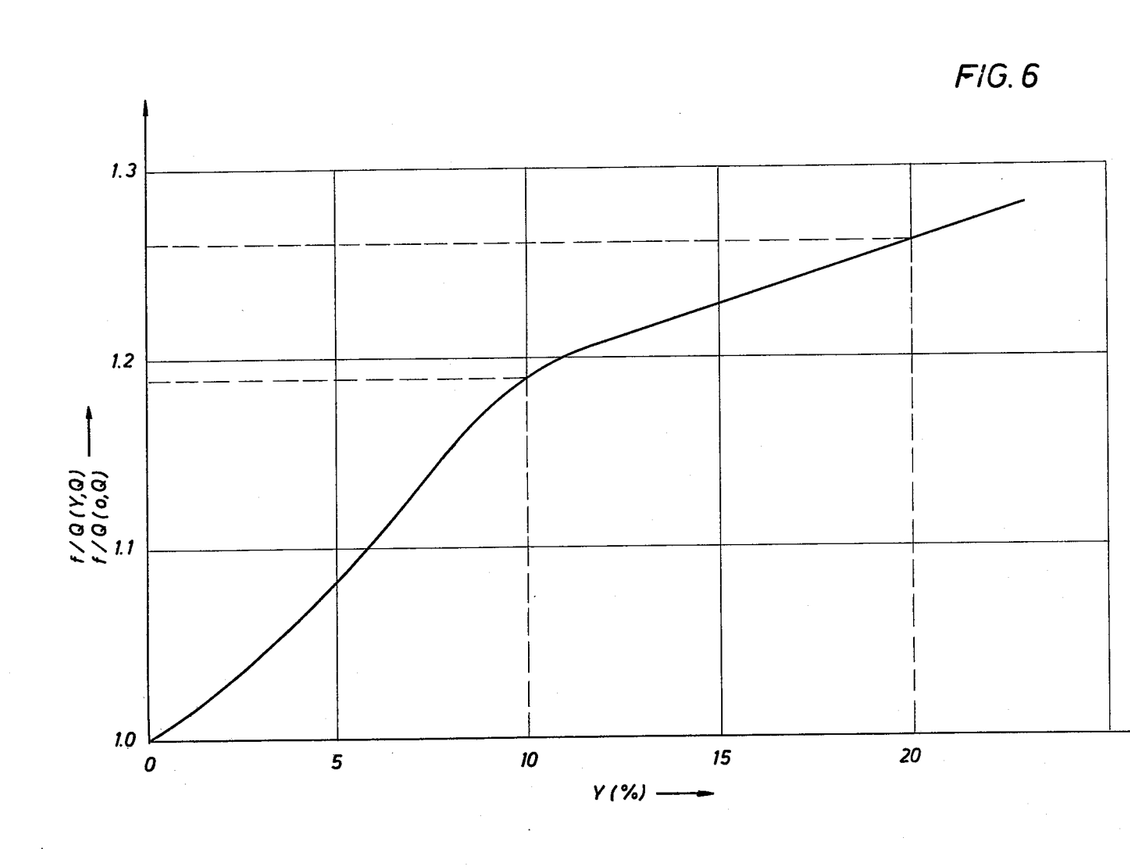
FIG. 6 is a graph showing the variation in the ratio f/Q (useful frequency component of the detection signal/liquid flowrate) as a function of the of bubble rate Y.

This considered, it has been noted that the ratio f/Q increases somewhat with the proportion of bubbles Y. FIG. 6 illustrates this variation, the parameter noted on the abscissa being the proportion of bubbles Y and that on the ordinate being the quotient of the ratio f/Q(Y,Q) corresponding to a proportion of bubbles Y and a flowrate Q to the ratio f/Q(O,Q) for Y=0 (liquid without bubbles) and the same flowrate Q. As of the value 1 for a liquid (Y=0), it is noted that this quotient is equal to 1.2 for a proportion of bubbles Y of 10%, representing an increase of 20%, and 1.27 for Y=20%, representing an increase of 27%.

The variations of the ratio f/Q can thus be expressed by:

$$f/Q = R(1 + n(Y)) \quad (1)$$

where R is a constant equal to the value of the ratio f/Q in the absence of bubbles, and the function n(Y) corresponds to the variations represented in FIG. 6 and is zero for Y=0. A precise determination of the liquid flowrate Q consequently requires knowledge of the bubble rate Y in addition to the frequency f.

The bubble rate Y is derived from the amplitude of the useful signal component. More specifically, in order to obtain an amplitude value compensated for its dependence on the flowrate, the ratio of the amplitude Ac (proportional to the velocity V) to the frequency f is formed. The value Ar thus produced is called hereinafter the reduced amplitude.

It was seen that the amplitude A of the signal coming from the unit 40 is proportional to the mean density d of the fluid. This mean density decreases in the presence of bubbles to an extent slightly smaller than the proportion of bubbles Y because the density of the gas is not fully negligible under the pressure conditions of the well. It was found however that the decrease of the amplitude, for a given bubble rate Y, was much greater than the predicted decrease, i.e., the decrease of the mean density of the fluid, and that the reduced amplitude Ar thus furnished a very amplified image of the proportion of bubbles Y and constituted an excellent indicator of the variations of Y.

Figure 7:
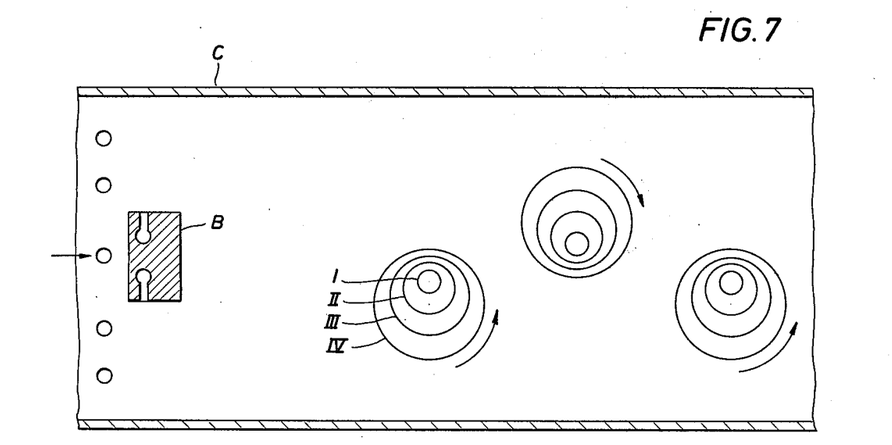
FIG. 7 illustrates the trapping of the gas bubbles in the vortices.

This amplification effect is attributable to the phenomenon of gas bubble trapping in vortices. It has in fact been noted that the bubble rate in the vortices was much greater than the average of the bubble rate in the fluid, the maximum being reached at the center of the vortices. This is illustrated in FIG. 7 in which has been represented only a cross-section of an obstacle B placed across a cylindrical conduit C in which a multiphase gas-liquid fluid flows in the direction indicated by the arrow. The bubble density was measured by means of an optical sonde in the wake of the obstacle. The vortices can be located by curves each corresponding to a given proportion of gas. The central curve I corresponds to the highest proportion, and the curves II, III and IV correspond to proportions which decrease as the distance from the center increases.

As an example, with a proportion of bubbles of 2.8% measured upstream of the obstacle, the curves I, II, III and IV correspond respectively to proportions of 20%, 10%, 4% and 2%.

The local density of the fluid at the center of the vortices is thus clearly lower than the mean density of the fluid. This explains why the reduced amplitude Ar, related to the local pressure, reflects the variations of the gas proportion or gas holdup in a highly amplified manner.

Figure 8:
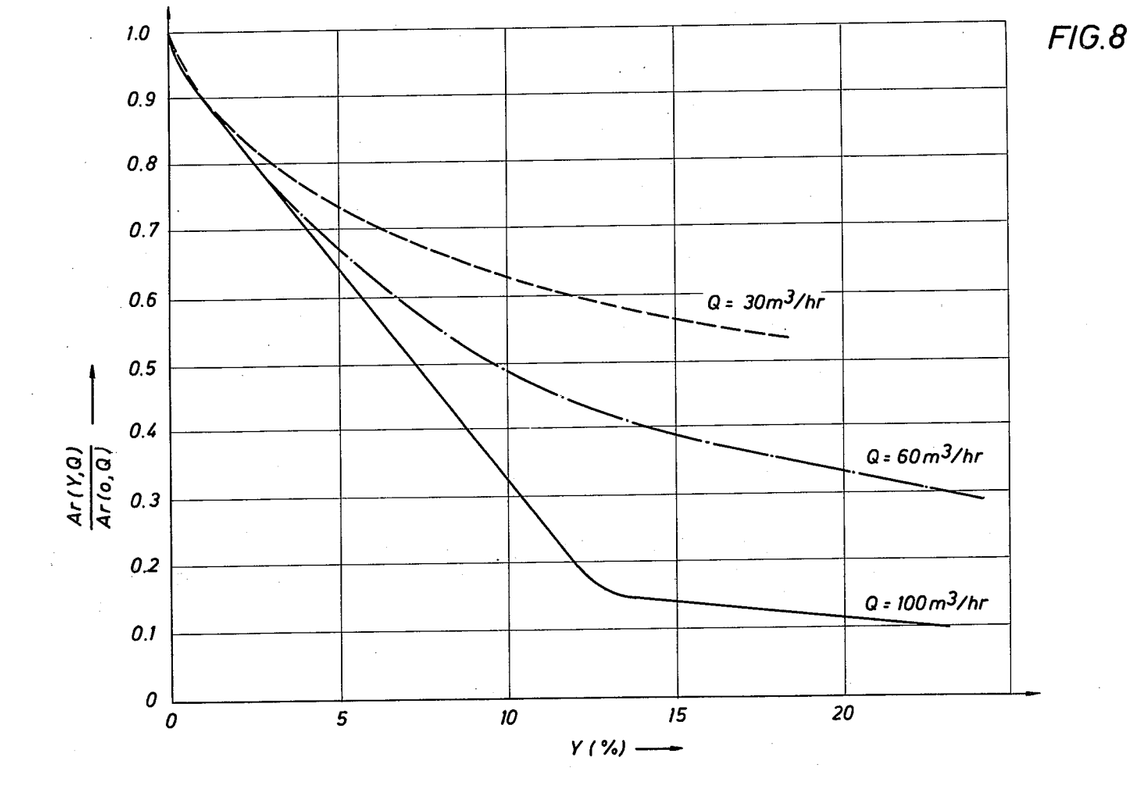
FIG. 8 shows a series of curves illustrating the variation, for a given flowrate, in the reduced amplitude $A_r$ as a function of the bubble rate Y.

The curves of FIG. 8 illustrate the dependence of the reduced amplitude Ar with respect to the gas holdup Y. The parameter on the ordinate is the ratio of the reduced amplitude Ar(Y,Q) for a bubble rate Y and a flowrate Q, to the reduced amplitude Ar(O,Q) for a zero bubble rate and the same flowrate Q. This ratio is obviously equal to 1 for Y=0. The solid-line curve corresponds to a flowrate Q of 100 m³/h, the mixed-line curve to a flowrate of 60 m³/h, and the broken-line curve to a flowrate of 30 m³/h.

It is observed that the reduced amplitude Ar undergoes a substantially linear decrease which is independent of the flowrate up to a value Y of about 2.5%. For this value, the decrease reaches about 20%, representing an amplification factor of about 8. For longer bubble rates the decrease in the reduced amplitude depends on the flowrate. It is greater at high flowrates: for a bubble rate of 12%, it reaches 85% at a flowrate of 100 m³/h, but less than 60% at a flowrate of 60 m³/h and slightly more than 40% at a flowrate of 30 m³/h. Beyond a bubble proportion of 12%, the decrease becomes much slower. This is due to the saturation of the vortices with gas bubbles. The saturation is reached earlier at low flowrates, thus explaining the dependence on the flowrate noted above.

In view of the preceding, it is possible to express the reduced amplitude Ar in the form $$Ar = d \cdot h(Y,Q) \qquad (2)$$

i.e., as the product of the mean density d of the fluid by a function of the bubble rate Y and of the flowrate Q, $h(Y,Q)$, to which correspond with a constant of proportionality the curves of FIG. 8.

It was seen that in the variations of the reduced amplitude, the predominant factor was the bubble rate, the role of the flowrate being secondary. This allows an approximation consisting of replacing the function $h(Y,Q)$ by a product of two functions $$k(Y)(1 + l(Q)) \qquad (3)$$

the function $k(Y)$ expressing the predominant influence of the bubble rate and the function $l(Q)$ defining the corrective factor related to the flowrate.

Further, the mean density d of the fluid varies with the bubble rate Y and is $$d(Y) = d_L(1-Y) + d_G \cdot Y \qquad (4)$$

where $d_L$ and $d_G$ are respectively the densities of the liquid and of the gas at the considered depth.

The term $d_G \cdot Y$ in equation (4) can be neglected. Thus equation (2) becomes:

$$Ar = d_L \cdot (1-Y) \cdot h(Y,Q) \qquad (5)$$

the product $(1-Y) \cdot h(Y,Q)$ being depicted by the curves of FIG. 8.

Let it be assumed that the density $d_L$ of the liquid undergoes only minor variations with the depth H in the well and can be treated as a known data for the well.

The expression (5) becomes, by replacing $h(Y,Q)$ by the product indicated in (3):

$$Ar = d_L(1-Y) \cdot k(Y)(1 + l(Q)) \qquad (6)$$

If we call $m(Y)$ the product $d_L(1-Y) \cdot k(Y)$, the expression (6) becomes:

$$Ar = m(Y)(1 + l(Q)) \qquad (7)$$

Using the function $m^{-1}$, reciprocal of the function $m(Y)$, we arrive at the expression $$Y = m^{-1}(Ar/(1 + l(Q))) \qquad (8)$$

Considering now the variation law of the ratio f/Q indicated in (1) above, the flowrate Q can be given by the expression:

$$Q = f/R(1 + n(Y)) \qquad (9)$$

Formulas (8) and (9) make it possible to calculate Q and Y by iteration from the frequency f and from the reduced amplitude Ar at the considered depth. One starts from a zero value for the bubble rate: $Y_o = 0$. The corresponding starting value of the flow rate is $Q_o = f/R$. One then calculates a first estimation $Y_1$ of the bubble rate by means of the equation (8) using the starting value $Q_o$ as a value of the flowrate. We then have:

$$Y_1 = m^{-1}(Ar/(1 + l(Q_o)))$$

This value $Y_1$ is placed in the formula (9) giving the flowrate to obtain an estimate $Q_1$ equal to:

$$Q_1 = f/(R + n(Y_1))$$

The iteration is pursued by means of this value $Q_1$ to obtain in the manner described a bubble rate value $Y_2$ and then a flow rate value $Q_2$ from this value $Y_2$, etc., until convergence. However, considering that the bubble rate will merely be used to derive a correction factor in the determination of the flow rate, an approximation may be sufficient, and the calculation can be stopped once values $Y_1$ and $Q_1$ are obtained.

The flowrate Q thus derived is the apparent flowrate, equal to the product of the apparent flow velocity V "seen" by the sonde by the flow area in the well. In order to determine the actual flowrate Qr, the apparent flowrate must be added with a term related to the proper velocity of the sonde, which term is the product of the sonde velocity Vs by the well cross-sectional area $s_p$. The area $s_p$ is a known data for the well. The sonde velocity Vs is at least on an average equal to the reeling speed of the cable 14, which speed is set to a determined value by the operator. Thus, the sonde velocity can also be treated as a known constant.

Figure 5:
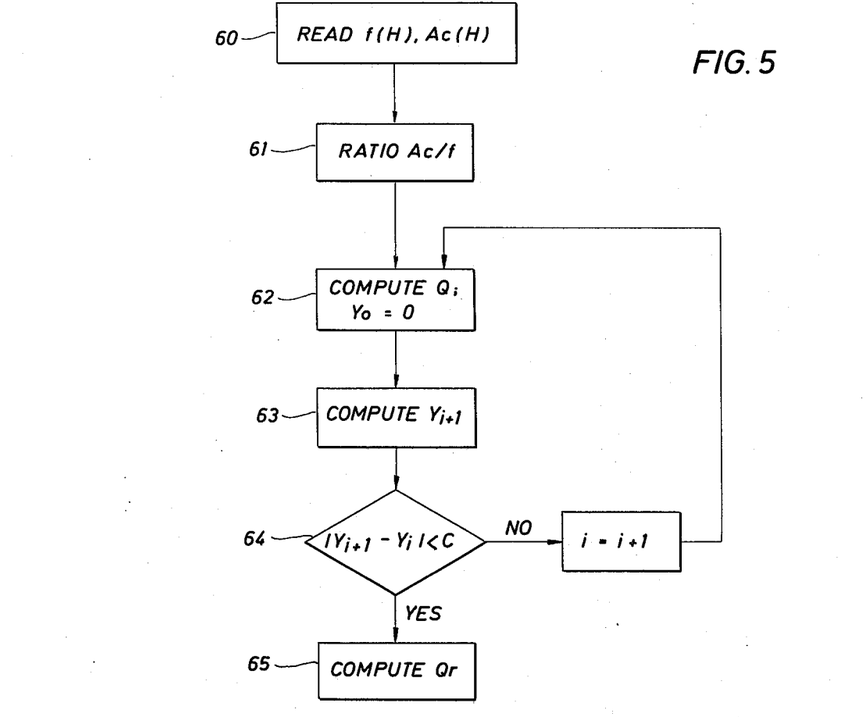
FIG. 5 is a flow sheet showing the operation of the computer in the surface equipment.

The flow chart of FIG. 5 illustrates the calculation steps accomplished by the computer 54 in the case of a complete iterative process. The data f(H) and Ac(H) are read in memories 53 and 53' (box 60). The computer derives the reduced amplitude Ar by forming the ratio Ac/f (box 61).

Boxes 62–64 show the iterative process. The flowrate value $Q_1$ is derived in accordance with equation (1) from the frequency f and fubble rate $Y_i$ derived from the preceding iteration (box 62). The value $Y_{i+1}$ is derived in accordance with equation (8) from the reduced amplitude Ar and the flow rate value $Q_i$, the liquid density $d_L$ being a constant of proportionality (box 63). The values $Y_{i+1}$ and $Y_i$ are compared (box 64). If their difference is smaller than a predetermined value C, the convergence is considered to be reached. Otherwise, the iterative process is continued.

Box 65 corresponds to the computation of the actual flow rate Qr by summing the flowrate Q computed as above with the term related to the displacement of the sonde.

A modified embodiment consists in compensating for the variations of the liquid density $d_L$ with the depth H. To that end, the density d of the fluid in the well is measured by a logging sonde such as a gradiomanometer. Advantageously, the density measurements will be achieved simultaneously with the flowrate measurements with a logging suite including the density sonde and the vortex flowmeter sonde.

With the knowledge of the density d(H) at depth H, one forms the ratio Ar(H)/d(H). The "normalized" amplitude An thus obtained is no longer dependent on the variations of the mean density of the fluid. With the notations above, we can write:

$$An = h(Y,Q) = k(Y) \cdot (1 + l(Q)) \qquad (7')$$

or $$Y = k^{-1}(An/1 + l(Q)) \qquad (8')$$

$k^{-1}$ being defined as the reciprocal of function k.

In accordance with this equation and equation (1) above:

$$Q = f/R(1 + n(Y)) \qquad$$

The computer accomplishes an iterative calculation with a starting value $Y_o=0$ for the bubble rate Y and furnishes once the convergence is reached values $Y_i$ and $Q_i$.

As in the above-described embodiment, the iterative process can be stopped after the first iteration. The values thus obtained are estimates $Y_1$ and $Q_1$ defined as follows:

$$Y_1 = k^{-1}(An/1 + l(Q_o)) \text{ with } Q_o = f/R$$

$$Q_1 = f/R(1 + n(Y_1))$$

The signals indicative of the density d(H) are stored in another storage device and read by the computer as it reads the frequency and amplitude data stored in memories 53 and 53' and pertaining to the same depth H.

The invention is not limited to the above-described embodiments. For instance, instead of forming the ratio Ac/f to obtain the reduced amplitude Ar compensated for the squared flowrate factor, one could effect a second integration of the signal in the surface equipment.

Moreover, while components 51 to 54 have been described as separate elements in the above description, it is to be understood that the functions of all of these elements can be fulfilled by a single computer operated in accordance with the appropriate programs.

I claim:

1. A method for determining the flowrate of a fluid flowing in a well, comprising the steps of:
lowering in the well a logging sonde comprising at least one vortex street generating obstacle and a transducer responsive to pressure variations due to the generation of vortices, the transducer producing, for each depth in the well, a detection signal the useful component of which has a frequency f and an amplitude A,
deriving from the detection signal a first signal indicative of frequency f,
deriving from the detection signal a second signal indicative of the reduced amplitude Ar, defined as the ratio $A/f^2$, and
forming from the first and second signals an indication of the flowrate in accordance with a first predetermined relationship expressing the frequency f as a function of the flowrate and of the bubble rate of the fluid at the respective depth, the first relationship including a linear dependency of the frequency f upon the flowrate, and a second predetermined relationship expressing the reduced amplitude Ar as a function of the bubble rate and of the flowrate.

2. The method of claim 1, wherein the second relationship defines the reduced amplitude as the product of a function of the bubble rate by a correction term dependent on the flowrate.

3. The method of claim 2, wherein the step of forming an indication of the flowrate is an iterative process comprising the steps of:
deriving from the frequency, in accordance with the first relationship, a starting flowrate value corresponding to a null starting value of the bubble rate,
deriving a bubble rate estimate from the reduced amplitude and the starting flowrate value in accordance with the second relationship, and
deriving a flowrate estimate from the frequency and the bubble rate estimate in accordance with the first relationship.

4. The method of claim 3, wherein the iterative process is continued until it converges.

5. The method of claim 1, wherein the derivation of the second signal comprises the steps of:
integrating the detection signal,
deriving a signal indicative of the amplitude of the signal thus integrated, and
forming the ratio of the signal to the first signal indicative of frequency f.

6. A method for determining the flowrate of a fluid flowing in a well, comprising the steps of:
lowering in the well a logging sonde comprising at least one vortex street generating obstacle and a transducer responsive to pressure variations due to the generation of vortices, the transducer producing, for each depth in the well, a detection signal the useful component of which has a frequency f and an amplitude A,
producing a signal indicative of the density of the fluid at the respective depth,
deriving from the detection signal a first signal indicative of frequency f,
deriving from the detection signal a second signal indicative of the reduced amplitude Ar, defined as the ratio $A/f^2$, forming a third signal indicative of the ratio of the reduced amplitude to the density, and forming from the first and third signals an indication of the flowrate in accordance with a first predetermined relationship expressing the frequency f as a function of the flowrate and of the bubble rate of the fluid at the respective depth, the first relationship including a linear dependency of the frequency f upon the flowrate, and a third predetermined relationship expressing the ratio as a function of the bubble rate and of the flowrate.

7. A method for determining the bubble rate in the fluid flowing in a well from a detection signal related to a given depth in the well and produced by a flowmeter logging sonde comprising at least one vortex street generating obstacle and a transducer responsive to pressure variations due to the generation of vortices by the obstacle, the useful component of the signal having a frequency f and an amplitude A, comprising the steps of:

deriving from the detection signal a first signal indicative of frequency f, deriving from the detection signal a second signal indicative of the reduced amplitude Ar, defined as the ratio $A/f^2$, and forming from the first and second signals an indication of the bubble rate in accordance with a first predetermined relationship expressing the frequency f as a function of the flowrate and the bubble rate, the first relationship including a linear dependency of the frequency f upon the flowrate, and a second predetermined relationship expressing the reduced amplitude Ar in terms of the bubble rate and the flowrate.

8. The method of claim 7, wherein a bubble rate estimate is formed by:

deriving from the frequency f in accordance with the first relationship a starting flow rate value corresponding to a null starting value of the bubble rate, and deriving a bubble rate estimate from the reduced amplitude and the starting flowrate value in accordance with the second relationship.

9. An apparatus for determining the flowrate of the fluid flowing in a well, comrising a flowmeter sonde adapted for movement through the well and including at least one vortex street generating obstacle and a transducer responsive to pressure variations due to the generation of vortices by said obstacle, said transducer producing, for each depth in the well, a detection signal the useful component of which has a frequency f linearly related to the flowrate and an amplitude A, a transmission cable from which the sonde is suspended, and signal processing means connected to the cable for deriving the flowrate from said detection signal, said signal processing means including means for deriving from said detection signal a first signal indicative of said frequency f and a second signal indicative of the reduced amplitude Ar, defined as the ratio $A/f^2$, and means for deriving from said first and second signals an indication of the flowrate in accordance with a first predetermined relationship expressing the frequency f as a function of the flowrate and of the bubble rate of the fluid at the respective depth, said first relationship including a linear dependency of the frequency f upon the flowrate, and a second predetermined relationship expressing the reduced amplitude Ar as a function of the bubble rate and of the flowrate.

* * * * *